(12) United States Patent
Dorea (10) Patent No.: US 12,507,672 B2
(45) Date of Patent: Dec. 30, 2025

(54) IMAGE-BASED ASSESSMENT OF HEALTH CHARACTERISTICS

(71) Applicant: Wisconsin Alumni Research Foundation, Madison, WI (US)

(72) Inventor: Joao Ricardo Reboucas Dorea, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 18/738,687

(22) Filed: Jun. 10, 2024

(65) Prior Publication Data

US 2024/0407339 A1   Dec. 12, 2024

Related U.S. Application Data

(60) Provisional application No. 63/471,905, filed on Jun. 8, 2023.

(51) Int. Cl.
| | |
|---|---|
| *A01K 29/00* | (2006.01) |
| *G06T 7/194* | (2017.01) |
| *G06V 10/26* | (2022.01) |
| *G06V 10/82* | (2022.01) |
| *G06V 10/98* | (2022.01) |
| *G06V 40/10* | (2022.01) |

(52) U.S. Cl.
CPC ........... *A01K 29/005* (2013.01); *G06T 7/194* (2017.01); *G06V 10/26* (2022.01); *G06V 10/82* (2022.01); *G06V 10/98* (2022.01); *G06V 40/10* (2022.01); *G06T 2207/20081* (2013.01); *G06T 2207/20084* (2013.01)

(58) Field of Classification Search
CPC .............. A01K 29/005; G06T 7/194; G06T 2207/20081; G06T 2207/20084; G06V 40/10; G06V 10/82; G06V 10/98; G06V 10/26
USPC ...................................... 340/573.3
See application file for complete search history.

(56) References Cited

U.S. PATENT DOCUMENTS

| | | | |
|---|---|---|---|
| 2005/0011466 A1* | 1/2005 | Doyle, II | A61K 39/42 119/518 |
| 2011/0279650 A1* | 11/2011 | Liao | G06V 20/64 348/46 |
| 2022/0217950 A1* | 7/2022 | Song | A61B 5/7257 |

(Continued)

OTHER PUBLICATIONS

Francois Chollet, "Xception: Deep Learning With Depthwise Separable Convolutions", CVPR Jul. 21-26, 2017, Honolulu, HI, USA. Computer Vision Foundation, IEEE Xplore, Nov. 9, 2017.

*Primary Examiner* — Kerri L Mcnally
(74) *Attorney, Agent, or Firm* — Crawford Maunu PLLC (57) ABSTRACT

Aspects of the present disclosure are directed to assessing health characteristics of livestock. As may be implemented with one or more embodiments herein, digital images of a plurality of animals are collected and segmented by partitioning the image into respective regions of pixels. For each of the collected images, the segmented version of the image is associated with a specific one of the animals and the segmented regions of respective ones of the images of each animal as collected over time. A health characteristic of each animal is classified in which the animal's body is characterized based on an association between the health characteristic and the assessed segmented regions.

20 Claims, 4 Drawing Sheets

(56) References Cited

U.S. PATENT DOCUMENTS

| | | | |
|---|---|---|---|
| 2023/0260327 A1* | 8/2023 | Canning | G06T 7/20 |
| | | | 382/100 |
| 2023/0292705 A1* | 9/2023 | Snyder | G16H 20/60 |
| | | | 119/51.02 |
| 2023/0337636 A1* | 10/2023 | Shmigelsky | G06V 30/147 |
| 2023/0342902 A1* | 10/2023 | Manafiazar | G06V 40/103 |
| 2023/0354781 A1* | 11/2023 | Ii | G06T 7/155 |

* cited by examiner

IMAGE-BASED ASSESSMENT OF HEALTH CHARACTERISTICS

OVERVIEW

Assessing heath characteristics of animals, such as livestock, may involve manual observation and monitoring, recording of data, and time-consuming approaches. For instance, drawing and analyzing blood can take time and require expense. While useful, such approaches may stop short of providing sufficient detail as to animal health. For instance, it may be challenging to accurately observe and identify certain characteristics, particularly with large numbers of livestock. These and other matters have presented challenges to characterizing the health of animals, for a variety of applications.

Various example embodiments are directed to apparatuses and methods involving image-based health assessment, which may address various challenges including those noted above.

As may be implemented in accordance with one or more embodiments, certain approaches are directed to utilizing digital images of a plurality of animals to assess animal health. This may involve, for example, segmenting the images by partitioning the image into respective regions of pixels, and for each of the collected images, associating the segmented version of the image with a specific one of the animals. For each of the animals, a health characteristic may be classified by characterizing the animal's body, including assessing the segmented regions of respective ones of the collected images of the animal and using an association between the health characteristic and animal image characteristics. These operations/functions may be carried out in a processor circuit. Further, the digital images may be obtained for assessment, such as by receiving such images over a communication medium and/or utilizing imaging circuitry to generate the images.

In a specific embodiment, digital images of a plurality of animals are collected and processed in a processor circuit as follows. The images are segmented by partitioning the image into respective regions of pixels. For each of the collected images, the segmented version of the image is associated with a specific one of the animals. For each animal, the segmented regions of respective ones of the images of the animal collected over time are assessed. A health characteristic of each animal is classified, including characterizing the animal's body based on an association between the health characteristic and the assessed segmented regions.

Another embodiment is directed to an apparatus including communication circuitry to receive digital images of a plurality of animals, and processing circuitry configured to carry out operations as follows. The processing circuitry segments the images by partitioning each image into respective regions of pixels and, for each of the images, associates the segmented version of the image with a specific one of the animals. For each of the plurality of animals, the processing circuitry assesses the segmented regions of respective ones of the images of the animal collected over time, and classifies a health characteristic of each animal, including characterizing the animal's body based on an association between the health characteristic and the assessed segmented regions.

The above discussion/summary is not intended to describe each embodiment or every implementation of the present disclosure. The figures and detailed description that follow exemplify various embodiments.

BRIEF DESCRIPTION OF FIGURES

Various example embodiments may be more completely understood in consideration of the following detailed description and in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of apparatuses, systems and methods involving the characterization of animal health. Certain aspects of the present disclosure have been shown to be beneficial when used in the context of assessing the health of a plurality of animals in a livestock facility, by imaging the animals over time and using a machine-vision approach to identify specific animals and track changes in the health thereof. While not so limited, various embodiments may be appreciated in such context.

Certain embodiments are directed to an automated imaging system that records images of cattle over time, processes those images to determine a change of volume over time, and provides a negative energy balance (NEB) score based on the change in images (e.g., as may relate to volume). A NEB scoring system correlates the change in volume of the animals using images taken with the presence of negative energy balance as indicated by metabolites in blood samples. This system facilitates learning, which may then be used to assess the health of additional (or the same) animals using images without necessarily obtaining blood samples. For instance, a computer vision system may utilize 3D images to compute the disappearance in body volume from prepartum through postpartum, for monitoring the NEB of individual animals on large scale. Animals may be grouped based on NEB, for instance by grouping animals into categories of high, medium, or low NEB.

Particular methods and/or apparatuses may be implemented in accordance with the following. Images of a plurality of animals are obtained and filtered to ensure images of desirable quality are obtained, for example by filtering images that do not capture an entire animal of a portion of the animal sufficient for analysis. Such images may include visible light and/or infrared light. A mask may be applied to provide a desirable image. A sequence of images may be utilized to produce analysis indicative of characteristics of the animal, with the analysis being useful for predicting health characteristics. Such sequences may be taken over time and may relate to certain health or other changes. For instance, images may be obtained three weeks before and after calving, to assess issues pertaining to postpartum such as ketosis or NEB. Certain embodiments involve grouping animals into categories, such as to determine how much to feed an animal or what to feed the animal.

In some instances, a learning model for classifying body conditions is trained using, for example, image characteristics as may involve shape, texture, and/or volume. Data may be combined for respective time points and assessed for characterizing animal health.

Certain embodiments are directed to a computer vision system utilized to generate high-throughput animal-level phenotypes that can be used to monitor potential health problems, animal growth, and welfare. For instance, such systems may assess based on 3D imaging to predict NEB in lactating dairy cows, using daily images from prepartum and postpartum. Negative Energy Balance is a result of an imbalance between high energy demand to supply milk production and lower levels of feed intake. Under such conditions, a cow may start to mobilize fat tissue and such mobilization may overload the liver. The excess of fat may lead the cow to metabolic problems. Accordingly, minute changes in a cow's body shape in the prepartum may be assessed to detect cows with a high risk of metabolic disorders.

High resolution imaging as coupled with data processing (and, in some instances, wearable technologies) may allow farmers to track body composition and health of animals. Such body composition monitoring may alleviate the need to interact with the animals to obtain such results, such as may otherwise require weighing of the animals and/or obtaining bodily fluids. This approach may provide a manner of identifying potentially sick animals (e.g., due to weight loss) or optimizing weight gain before slaughter. Further, such a monitoring approach can be carried out continuously to improve early detection of issues as relative to, for example, manual approaches carried out less frequently due to available time and workforce.

In a particular embodiment as may utilize one or more apparatuses or components as described herein, a computer vision system (CVS) having one or more cameras (e.g., as may include a 3D camera) acquires a top-down view of infrared and depth images from the dorsal area of one or more cows. The camera generates three types of images: depth, RGB (Red, Green, and Blue) and infrared. The images collected through the CVS are saved with their respective metadata, which may include cow identification, date, and time.

The system coordinates the camera(s) by calculating the distance from the camera position (top-down view) to the floor. When the distance changes, this is an indication of a cow walking under the camera(s), and depth values computed by the camera change accordingly. In response to this change, the system triggers the camera(s) to collect a sequence of frames and saves all images by date and animal in ".PNG" (color) and ".TIFF" (depth) formats.

After saving the data, the system pre-processes the images to exclude or select images that contain a single individual animal and to remove the background. This processing step may classify images into "usable" and "unusable," in which "usable" are images with a single individual animal. If classified as "usable", the background may be removed such that only a cow body is in the image, for instance via semantic segmentation using a convolutional neural network (CNN, e.g., U-Net as developed by the University of Freiburg, Freiburg im Breisgau, Baden-Wurttemberg, Germany).

After image segmentation, feature extraction may be implemented using two approaches: 1) biological features, and 2) computational features. The biological features, here called biometric body measurements, may be associated with body weight and shape, such as dorsal area, dorsal width, body volume, eccentricity, and Fourier shape descriptors. The computational features may be extracted using feature maps of a pre-trained CNN for animal body segmentation, and from convolutional autoencoders.

The output of the deep neural networks is used in combination with biological features as image-based predictors, and in combination with other covariates to early detect health issues such as those associated with negative energy balance. The other data are cow variables such as parity, diet, breed, and feeding behavior.

Various embodiments are directed to predicting disease based on sub-clinical ketosis and cyclicity of an animal. Cyclicity refers to an animal, such as a cow, cycling, which means the animal has progesterone levels that return to levels (e.g., high levels) for reproduction after calving.

In accordance with other embodiments, data is extracted from communications signals relevant to a particular premises or group of livestock, and utilized in assessing one or more of the livestock. For instance, data may be extracted using software, such as from voice and/or textual communications, relating to the livestock. Such data may relate, for example, to a reference to the health of particular animal, or to a protocol used in assessing, treating or otherwise managing livestock on a particular day. This data may be collected and features may be extracted using pre-trained models. Further, the data may be utilized in a learning algorithm as characterized herein, as an additional input to facilitate assessing the health of animals. The output can be combined with image data as characterized herein, to further assess the condition of livestock.

Certain particular embodiments employ one or more machine learning algorithms, artificial intelligence algorithms, or a combination thereof, for instance in connection with learning algorithms as characterized herein. For example, various systems and methods may utilized trained AI processing with data characterizing animals as noted herein, for example as may relate to imaging of the animals and/or communication data (e.g., voice, text, imagery or other data) as noted above. For instance, one or more trained machine learning models may be adapted to evaluate data and data sources that capture information from animals. Analysis of exemplary data may involve identifying correlations and relationships between different types of data specific to a certain animal or group of animals.

In some examples, one or more components are configured to manage the application of one or more AI models to enhance processing described in the present disclosure. Trained AI processing may be implemented to aid determinative or predictive processing including specific processing operations described with respect to determinations, classification ranking/scoring and relevance ranking/scoring. An exemplary component for implementation trained AI processing may manage AI modeling including the creation, training, application, and updating of AI modeling. Trained AI processing may be adapted to execute specific determinations described herein including those for analyzing specific data and data sources of an image acquisition system. For instance, an AI model may be specifically trained and adapted for execution of processing operations pertaining to analyzing animals as in the examples described herein. Exemplary AI processing may be applicable to aid any type of determinative or predictive processing by any components of the present disclosure, via any of: learning for assessing animal imagery, learning for prioritizing actions relative to the monitored animals, and learning for manners in which to assess and/or present respective opportunities, among other examples. In one example, a trained AI processing approach utilizes a hybrid AI model (e.g., hybrid machine learning model) adapted and trained to execute a plurality of operations as described in the present disclosure. Another trained AI processing approach may utilize a collective application of a plurality of trained AI models that are separately trained and managed to execute processing described herein.

Various approaches to supervised learning may be applied, and may include one or more of: nearest neighbor processing; naive bayes classification processing; decision trees; linear regression; support vector machines (SVM) neural networks (e.g., convolutional neural network (CNN) or recurrent neural network (RNN)); and transformers. Approaches to unsupervised learning may include: application of clustering processing including k-means for clustering problems, hierarchical clustering, mixture modeling, etc.; application of association rule learning; application of latent variable modeling; anomaly detection; and neural network processing, among other examples. Approaches to semi-supervised learning may include one or more of assumption determination processing, generative modeling, low-density separation processing, and graph-based method processing. Non-limiting examples of reinforcement learning that may be applied include one or more of value-based processing, policy-based processing, and model-based processing. Furthermore, a component for implementation of trained AI processing may be configured to apply a ranker to generate relevance scoring to assist with any processing determinations with respect to any relevance analysis, such as that relating to characteristics of monitored animals. Scoring for relevance (or importance) ranking may be based on individual relevance scoring metrics or an aggregation of such scoring metrics. Weighting may be applied to prioritize one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing.

Certain embodiments are directed to a method in which digital images of a plurality of animals are collected (e.g., obtained or received), and processed in a processor circuit as follows. The images are segmented by partitioning the image into respective regions of pixels. For each of the collected images, the segmented version of the image is associated with a specific one of the animals. For instance, each of the digital images may be associated with one of the plurality of animals using a two-dimensional aspect of one of the collected images of the animals, in which a three-dimensional aspect of one of the collected images may be segmented. The segmented regions of respective ones of the collected images of each animal over time are assessed, and a health characteristic of each animal is determined. This may include characterizing the animal's body based on an association between the health characteristic and the assessed segmented regions. For instance, subclinical ketosis may be predicted based on the classified health characteristic. In certain instances, a recommended treatment is output based on the classified health characteristic.

Segmenting the images may include, for example, assessing pixels in the respective regions to identify body shape characteristics of an animal in each collected image of the animal. The health characteristic of the animal is classified by associating the body shape characteristics with body shape characteristics associated with the health characteristic. Images may be filtered out based on quality, prior to segmenting the images.

Various approaches to classifying the health characteristic of the animal may be carried out to suit particular applications. For instance, an NEB of the animal may be detected, in which the NEB is indicative of the animal expending more energy than energy obtained via ingestion of food. This may involve detecting mobilization of fat tissue based on the segmented images. This may involve detecting a change in energy balance over a time period, using respective ones of the collected images of the animal taken over the time period, and detecting a rate of change in fat tissue over the time period. A health issue of the animal may be identified based on the rate of change in fat tissue. In some instances, data obtained via computer vision is utilized, and which may include aspects selected from the group of: feeding behavior, cow variables such as calving interval and parity, and a combination thereof.

In certain embodiments, certain ones of the animals are grouped together based on the assessed segmented regions, in which classifying the health characteristic of the animal includes classifying health characteristics of one of the groups of animals.

Collecting the digital images may include collecting images of each of the plurality of animals over time, in which instance the segmented regions of respective ones of the images collected at different times may be assessed and the health characteristic may be classified based on differences in the assessed segmented regions.

Ketosis may be detected by assessing biological features depicted by the segmented regions and creating a volume area mask based on the segmented regions. For a particular region, feature maps are computed from convolutions and subsampling to produce an output depicting changes in portions of the volume area mask, and ketosis may be detected based on the output.

In certain embodiments, a learning algorithm is executed as follows. Biological samples of an animal are obtained at times correlated to times at which particular images of the animal are taken. Biological characteristics indicated by the samples are associated with characteristics of the images, and an algorithm is set for processing additional images based on the associating.

Another embodiment is directed to an apparatus including communication circuitry to receive digital images of a plurality of animals, and processing circuitry configured to carry out operations as follows. The processing circuitry segments the images by partitioning each image into respective regions of pixels and, for each of the images, associates the segmented version of the image with a specific one of the animals. For each of the plurality of animals, the processing circuitry assesses the segmented regions of respective ones of the images of the animal collected over time, and classifies a health characteristic of each animal, including characterizing the animal's body based on an association between the health characteristic and the assessed segmented regions. For instance, the processing circuitry may segment the images by assessing pixels in the respective regions to identify body shape characteristics of an animal in each collected image of the animal, and may classify the health characteristic of the animal by associating the body shape characteristics with body shape characteristics associated with the health characteristic.

The processing circuitry may classify the health characteristic of the animal in a variety of manners. In some instances, the processing circuitry detects a negative energy balance of the animal indicative of the animal expending more energy than energy obtained via ingestion of food. The processing circuitry may detect the negative energy balance by detecting a change in energy balance over a time period using respective ones of the collected images of the animal taken over the time period, and detecting a rate of change in fat tissue over the time period. A health issue with the animal may be identified based on the rate of change in fat tissue, or mobilization of fat tissue, for instance based on the segmented images.

Figure 1:
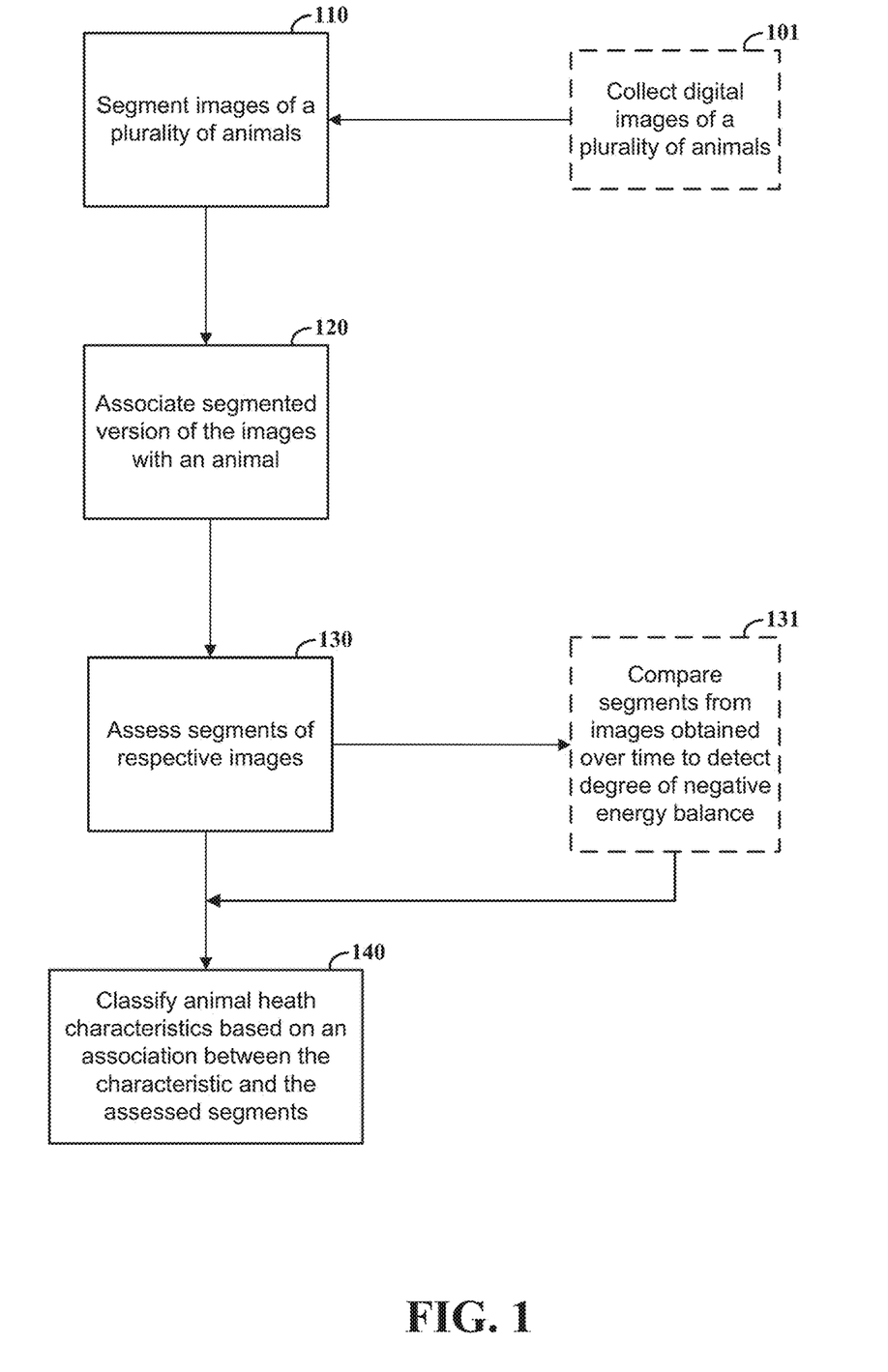
FIG. 1 shows a method for classifying health characteristics of a plurality of animals, as may be implemented in accordance with various embodiments.

Turning now to the figures, FIG. 1 shows a method for classifying health characteristics of a plurality of animals, as may be implemented in accordance with various embodiments. At block 110, images of a plurality of animals are segmented, with certain embodiments being directed to also collecting the images at block 101. Segmented versions of the images are associated with an animal at 120, for example utilizing learned shape characteristics to identify a particular animal relative to other animals being imaged. For each animal, segments of receptive images are assessed at block 130. This may involve, for example, specific aspects involving comparing segments from images obtained over time to detect a degree of NEB at block 131. At block 140, health characteristics of each animal are classified based on an association between the characteristic and the assessed segments. For instance, if a particular drop in volume of the animal is detected postpartum, the animal may be automatically classified as having a certain degree of NEB. Where that NEB is of a value that creates issues, an alert can be automatically generated. Further, as the process in FIG. 1 may be carried out regularly, for instance twice daily, real-time monitoring of animals can be utilized to rapidly detect changes in health, which can improve the ability to detect changes early. In addition, machine vision may detect very minute changes that may likely otherwise be much less detectable with the human eye, avoiding delay in treatment.

Figure 2:
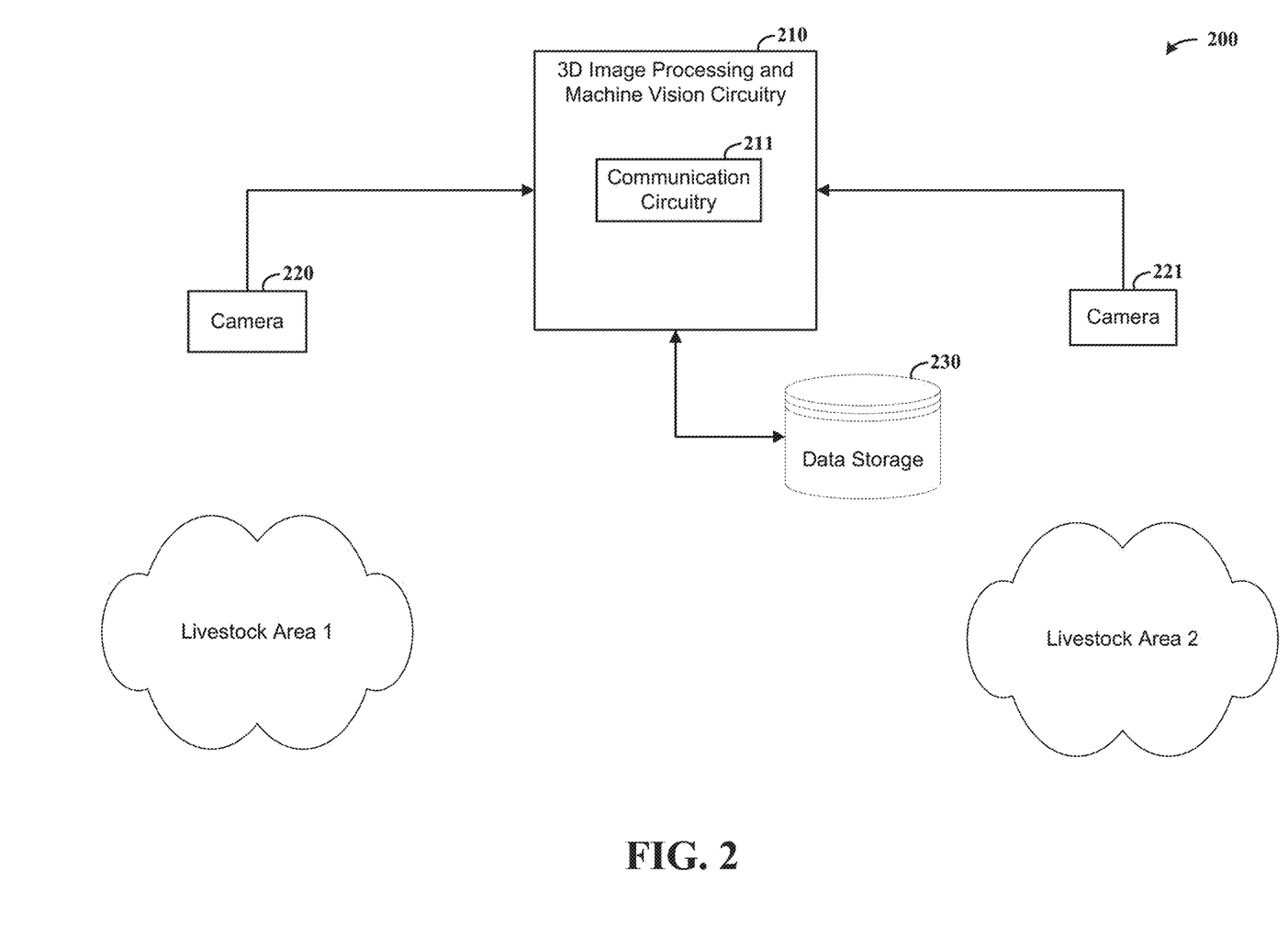
FIG. 2 shows an apparatus for classifying health characteristics of a plurality of animals, in accordance with various embodiments.

FIG. 2 shows an apparatus 200 for classifying health characteristics of a plurality of animals, as may be implemented in accordance with various embodiments. 3D image processing and machine vision circuitry 210 operates to process images of animals as characterized herein, with communication circuitry 211 operable to obtain such images. Such images and related data, for instance as may pertain to an animal's volume, weight or other characteristics, may be collected and stored over time in database 230. The images are analyzed, for instance as characterized in FIG. 1 and/or otherwise herein, for assessing health. The images may be received from cameras 220 and 221 as shown for a particular livestock facility, respectively providing images of different livestock areas (shown as 1 and 2, by way of example).

In some implementations, the circuitry 210 receives images from a multitude of locations and as obtained from cameras at each location. Animal health is characterized for specific animals and results are sent for use at each location. For instance, the circuitry 210 may be remote (e.g., as cloud-based processing), and receive data from the cameras as provided remotely. Results may be sent back to the cameras and/or other related componentry for collecting and providing data upon which animals may be handled.

Figure 3A:
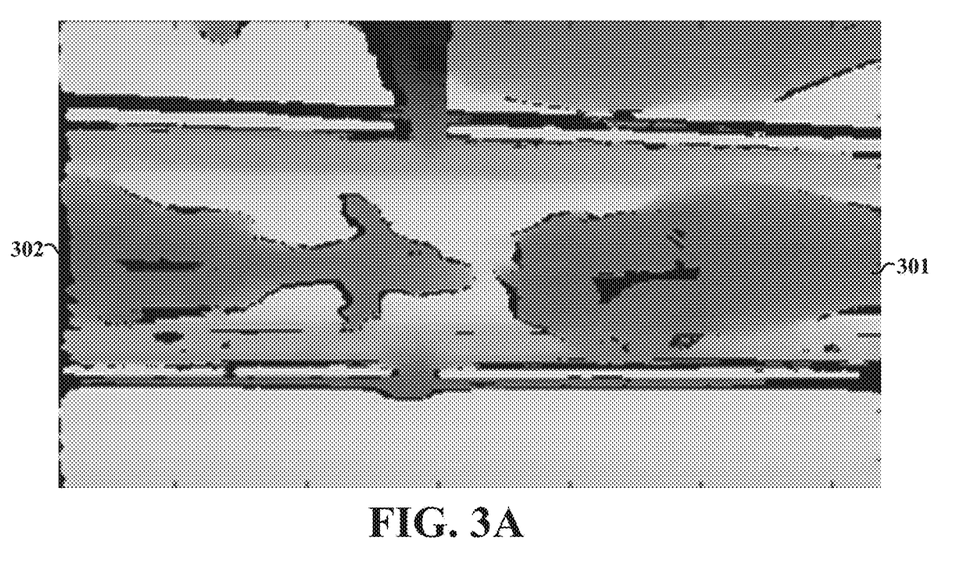
FIGS. 3A and 3B show an approach to imaging animals and identifying whole images, as may be implemented in accordance with various embodiments.
Figure 3B:
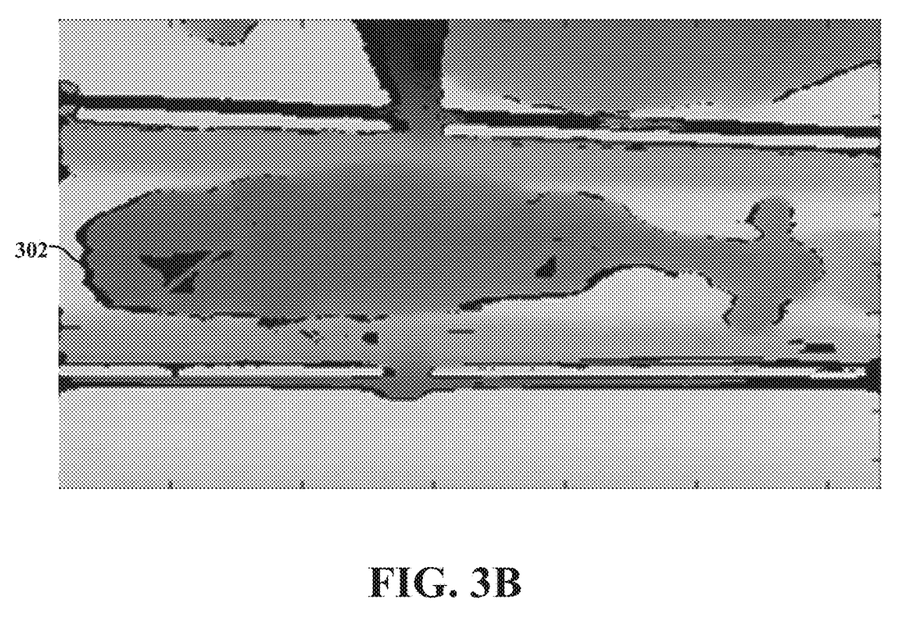

FIGS. 3A and 3B show an approach to imaging animals and identifying whole images, as may be implemented in accordance with various embodiments. Beginning with FIG. 3A, an image of cattle is shown in which portions of two animals 301 and 302 are within a camera's field of view, for example as moving by a fixed camera. However neither animal is shown in its entirety (or near entirety), such that the image may be classified as unacceptable. FIG. 3B shows an acceptable image, in which most or all of animal 301 is within the camera's field of view, for example as animal 301 has moved past the field of view and animal 302 has moved into the field of view. As such, these images may be automatically processed using a programmed computer as characterized herein, which discards the image shown in FIG. 3A and utilizes the image shown in FIG. 3B.

Figure 4:
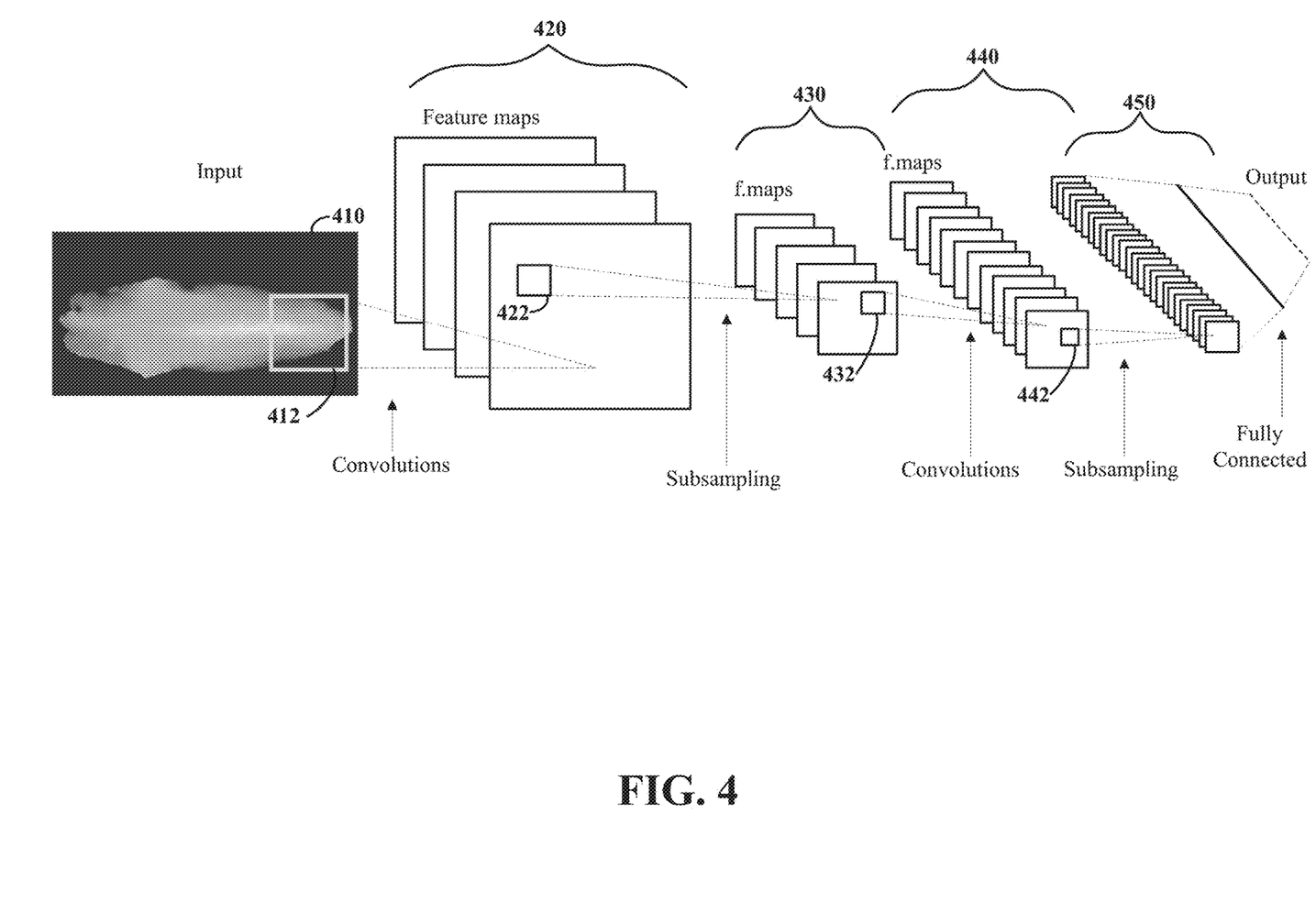
FIG. 4 shows an approach to sampling images from an animal, as may be implemented in accordance with various embodiments.

FIG. 4 shows an approach to sampling an image 410 of an animal, as may be implemented in accordance with various embodiments. A portion 412 of the image 410 is utilized for providing convolutions, and a set of feature maps 420 is generated. A portion 422 of the feature maps is subsampled and a further set of maps (f.maps) 430 is generated. A portion 432 of the maps 430 is utilized for providing further convolutions and another set of maps 440 is generated. A portion 442 is subsampled to generate another set of features 450 that are used to prepare a fully connected output that characterizes biological features of the animal, such as body volume and area. These features can be generated along with computational features for a specific time point.

Tracking such analysis of a particular animal over time can be useful for assessing health characteristics of the animal, for example as may be implemented with one or more approaches and/or systems as characterized herein. For instance, biological conditions may be detected by assessing biological features depicted by the segmented regions and creating a volume area mask based on the segmented regions. For a particular region, feature maps may be computed from the convolutions and subsampling to produce an output depicting changes in portions of the volume area mask, and one or more biological conditions may be detected based on the output.

Various embodiments implement aspects of U.S. Provisional Patent Application Ser. No. 63/471,905, to which priority is claimed and which is fully incorporated herein by reference. For instance, the document noted as an Appendix (and which forms part of the Provisional Patent Application) includes several figures as may be implemented in accordance with various embodiments, such as for predicting NEB and ketosis, with various exemplary/experimental-type applications. Infrared and depth images may be taken by a camera, and cloud-computing framework may be utilized to classify images as bad or good (e.g., with partial images of cattle being insufficient by way of example), and to segment good images. The segments are used to identify specific animals, and may be utilized to provide a body condition score. Segments for prepartum and postpartum images may be utilized to provide early detection of subclinical ketosis, which may involve various computational operations as shown. Various approaches may utilize a Convolutional Neural Network (CNN) and Xception architecture, for instance as characterized in "Xception: Deep Learning with Depthwise Separable Convolutions," Chollet, Francois, which is fully incorporated herein by reference.

Certain embodiments involving a computer vision system/approach may be implemented as shown and described in the Appendix of the underlying provisional application, for experimental-type embodiments in which 3D images collected from Holstein cows in the prepartum period are processed. One or more machine learning algorithms may be applied to these images in order to detect ketosis events early. In a specific experimental type embodiment, 27,300 3D images from 76 Holstein cows may be individually collected at 21, 14 and 7 days prior to calving. Top-down view images may be acquired using an Intel RealSense D435 depth camera. All images can be processed to remove background pixels, and the following three biological features may be extracted: the number of pixels containing the cow, its estimated surface area, and the projected volume of the cow's body. A multitude (e.g., 1,024) of features may be extracted from the image dataset using a CNN with Xception architecture as noted above.

The features extracted using CNN may be combined with the biological features for each point in time (21, 14, and 7 days prior to calving), and used as inputs to predict ketosis events during the first 15 days after calving. A test set of cows may be selected and used to train a Gradient Boosting Decision Tree (GBDT) and a Partial Least-Squares Discriminant Analysis (PLS-DA) model, using 5-fold cross-validation to choose hyperparameters aiming to maximize F1 score. This procedure can be performed multiple times to account for variabilities in the dataset. With metrics in the format (mean+−st. dev.), the GBDT model may realize a precision of 0.650+−0.090, recall of 0.912+−0.102, and F1 score of 0.754+−0.081, and the PLS-DA achieved a precision of 0.630+−0.094, recall of 0.908+−0.106 and F1 score of 0.739+−0.086.

Other applications of this analytical technique could include other variables obtained from complementary computer vision systems, such as those related to feeding behavior, and cow variables, such as calving interval and parity. Further, external inputs such as may include communications from users overseeing the cows may be utilized to further assess each of the cows relative to the inputs (e.g., voice recording, text that provides a user assessment of the cow).

A particular embodiment is directed to an approach shown at page 4 in the Appendix in the underlying provisional application, which may be implemented in connection with one or more embodiments herein, for instance as depicted in FIGS. 1 and/or 2. A depth camera may be used to calculate a distance to an underlying surface such as a floor, for instance on a regular basis such as every second. If the calculated distance changes, this may be indicative of livestock moving into position between the depth camera and the floor, in response to which a sequence of images may be acquired. If an animal in the image is moving or misaligned, the image may be of good or bad quality as depicted. Convolutional neural network processing may be applied to automatically select images considered a "good" image, for instance those images from which a significant portion of an animal can be obtained and used for analysis. For images selected as good, an algorithm can be applied to remove the background.

Based upon the above discussion and illustrations, those skilled in the art will readily recognize that various modifications and changes may be made to the various embodiments without strictly following the exemplary embodiments and applications illustrated and described herein. For example, other types of image analysis may be utilized to characterize volume/size and related NEB. Such modifications do not depart from the scope of various aspects of the invention, including aspects set forth in the claims.

What is claimed is:

1. A method comprising:
   collecting digital images of a plurality of animals; and
   in a processor circuit,
      segmenting the images by partitioning each image into respective regions of pixels to form segmented versions of each image;
      for each of the collected images, associating the segmented version of the image with a specific one of the animals;
      for each of the plurality of animals, assessing the segmented regions of respective ones of the images of the animal collected over time; and
      classifying a health characteristic of each animal, including characterizing the animal's body based on an association between the health characteristic and the assessed segmented regions.

2. The method of claim 1, wherein:
   segmenting the images includes assessing pixels in the respective regions to identify body shape characteristics of an animal in each collected image of the animal; and
   classifying the health characteristic of the animal includes associating the body shape characteristics with body shape characteristics associated with the health characteristic.

3. The method of claim 1, wherein classifying the health characteristic of the animal includes detecting a negative energy balance of the animal indicative of the animal expending more energy than energy obtained via ingestion of food.

4. The method of claim 3, wherein classifying the health characteristic includes detecting mobilization of fat tissue based on the segmented images.

5. The method of claim 3, wherein:
   detecting a negative energy balance includes detecting a change in energy balance over a time period using respective ones of the collected images of the animal taken over the time period, and detecting a rate of change in fat tissue over the time period; and
   identifying a health issue with the animal based on the rate of change in fat tissue.

6. The method of claim 1, further including grouping ones of the animals together into groups based on the assessed segmented regions, where classifying the health characteristic of the animal includes classifying health characteristics of one of the groups of animals.

7. The method of claim 1, further including associating each of the digital images with one of the plurality of animals using a two-dimensional aspect of one of the collected images of the animals, wherein segmenting the images includes segmenting a three-dimensional aspect of one of the collected images.

8. The method of claim 1, further including predicting subclinical ketosis based on the classified health characteristic.

9. The method of claim 1, wherein collecting the digital images includes collecting images of each of the plurality of animals over time, and wherein classifying the health characteristic of the animal includes assessing the segmented regions of respective ones of the images collected at different times and classifying the health characteristic based on differences in the assessed segmented regions.

10. The method of claim 1, further including detecting ketosis by:

assessing biological features depicted by the segmented regions and creating a volume area mask based on the segmented regions;

for a particular region, computing feature maps from convolutions and subsampling to produce an output depicting changes in portions of the volume area mask; and detecting ketosis based on the output.

11. The method of claim 1, further including executing a learning algorithm by:

obtaining biological samples of an animal at times correlated to times at which particular images of the animal are taken;

associating biological characteristics indicated by the samples with characteristics of the images; and setting an algorithm for processing additional images based on the associating.

12. The method of claim 1, further including outputting a recommended treatment based on the classified health characteristic.

13. The method of claim 1, wherein classifying the health characteristic includes utilizing data obtained via computer vision as may include aspects selected from the group of: feeding behavior, cow variables such as calving interval and parity, and a combination thereof.

14. The method of claim 1, further including filtering out images based on quality, prior to segmenting the images.

15. The method of claim 1, wherein collecting digital images of the plurality of animals includes:

calculating the distance from a position of an overhead camera, used to collect the digital images, to an underlying surface for images collected over time;

in response to the calculated distance changing, which provides an indication that one of the animals has moved into position under the camera, triggering the camera to collect a sequence of images; and processing the sequence of images to provide the collected digital images as images that contain a single animal, and to remove the background from the images.

16. An apparatus comprising:

communication circuitry to receive digital images of a plurality of animals; and processing circuitry configured to:

segment the images by partitioning each image into respective regions of pixels to form segmented versions of each image;

for each of the images, associate the segmented version of the image with a specific one of the animals;

for each of the plurality of animals, assess the segmented regions of respective ones of the images of the animal over time; and classify a health characteristic of each animal, including characterizing the animal's body based on an association between the health characteristic and the assessed segmented regions.

17. The apparatus of claim 16, wherein the processing circuitry is configured to:

segment the images by assessing pixels in the respective regions to identify body shape characteristics of an animal in each image of the animal; and classify the health characteristic of the animal by associating the body shape characteristics with body shape characteristics associated with the health characteristic.

18. The apparatus of claim 16, wherein the processing circuitry is configured to classify the health characteristic of the animal by detecting a negative energy balance of the animal indicative of the animal expending more energy than energy obtained via ingestion of food.

19. The apparatus of claim 18, wherein the processing circuitry is configured to classify the health characteristic by detecting mobilization of fat tissue based on the segmented images.

20. The apparatus of claim 18, wherein the processing circuitry is configured to:

detect the negative energy balance by detecting a change in energy balance over a time period using respective ones of the images of the animal taken over the time period, and detecting a rate of change in fat tissue over the time period; and identify a health issue with the animal based on the rate of change in fat tissue.

* * * * *